UNITED STATES PATENT OFFICE.

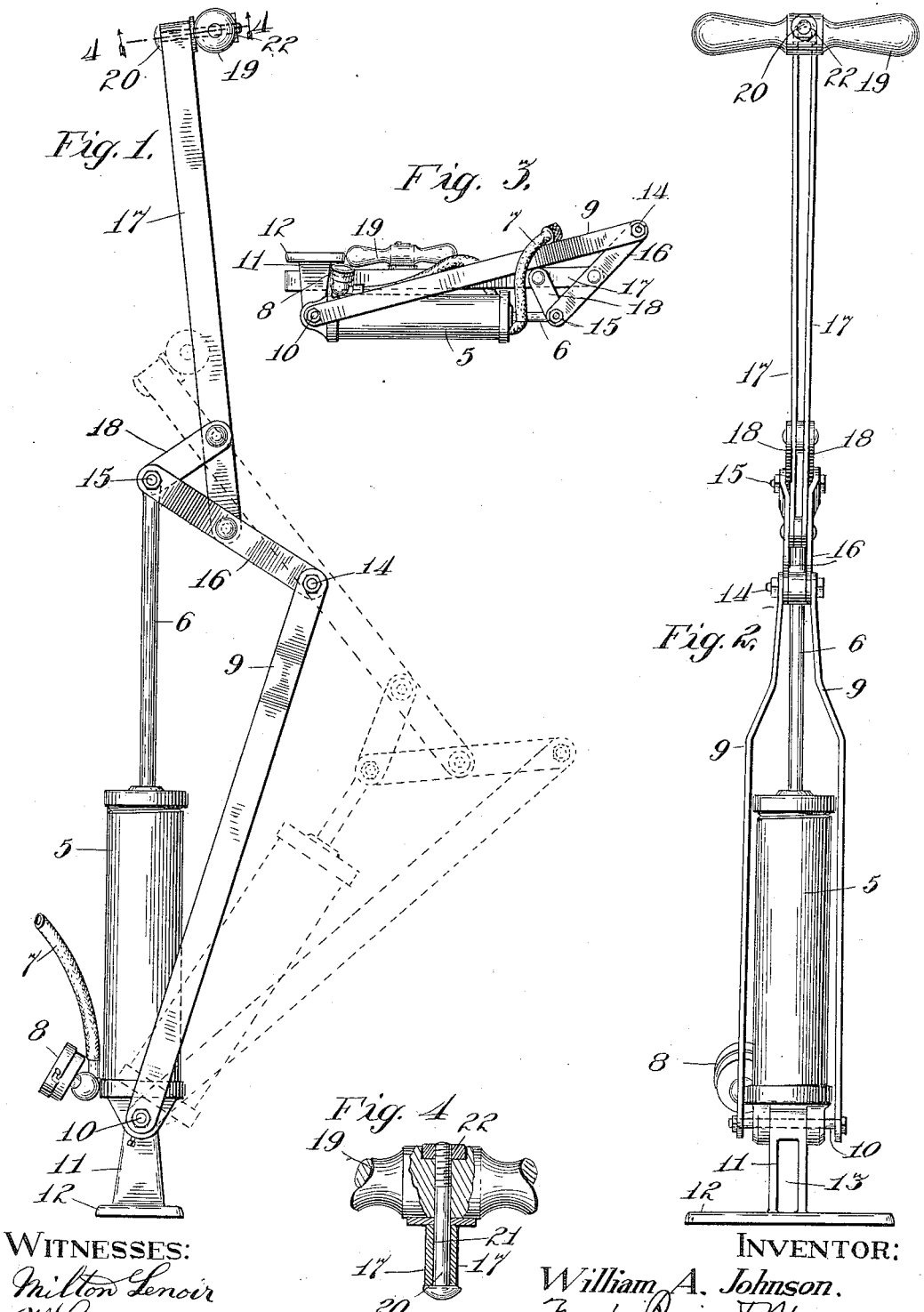

WILLIAM A. JOHNSON, OF CHICAGO, ILLINOIS.

PUMP.

1,075,574.  Specification of Letters Patent.  Patented Oct. 14, 1913.

Application filed September 14, 1912. Serial No. 720,313.

*To all whom it may concern:*

Be it known that I, WILLIAM A. JOHNSON, a citizen of the United States, residing at Chicago, in the county of Cook and State of Illinois, have invented certain new and useful Improvements in Pumps, of which the following is a specification.

My invention relates to improvements in pumps, and has for its general object to provide a compact, easily portable, convenient pump, which may advantageously be employed for manual operation to produce high pressure.

In the drawings wherein I have illustrated an embodiment of my invention, Figure 1 is a side elevation of the pump in one operating position, another position being shown in dotted lines to indicate the character of movements imparted to the parts in the course of operation; Fig. 2 is a front elevation of the pump; Fig. 3 is a side view showing the pump collapsed or folded; and Fig. 4 is a fragmentary detail showing the mounting of the handle.

In the embodiment of my invention shown, 5 indicates the pump cylinder and 6 the piston rod.

My present invention is not concerned with details of the pump proper, and contemplates the use of any desired form of reciprocating pump.

7 indicates an exhaust passage from the pump, herein shown as a flexible tube, such as is commonly employed for connecting a pump to a vehicle tire, and 8 indicates a pressure gage communicating with the cylinder for indication of the pressure therein. The pump cylinder is supported for pivotal movement in operation, and is associated with fulcrum levers 9—9 likewise pivotally supported at their lower ends, adjacent the bottom of the cylinder, the support therefor being preferably of a character to be positioned upon the ground by the feet of the user.

Specifically, 10 indicates a pivot pin passing through boss 11 of a base member 12 and affording pivotal support for the pump and for the fulcrum levers 9—9. The boss 11 is slotted as at 13 to receive at handle-lever, to be described, when the device is folded. The two fulcrum levers 9—9, are spaced far enough apart to permit the pump cylinder 5 to pass between them and extend above the upper end of the cylinder. This construction is one convenient way of providing long fulcrum levers, pivotally movable with respect to the plane on which the pump is supported, and with respect to the pump cylinder. At their upper ends these fulcrum levers preferably converge and are connected by a pivot pin 14. Between pin 14 and pin 15 carried by the piston rod 6 is pivoted link 16 near the center of which is secured a slotted handle lever 17, preferably made of a doubled length of strut strap iron 18 being secured between the handle lever and the pin 16.

A transverse handle 19 is provided for purposes of adjustment of the handle with respect to handle lever 17. The handle is mounted on a bolt 20 engaging in the slot 21 in the handle lever, the nut 22 being secured in a recess in the handle so that rotation of the handle carrying with it the nut, loosens the handle for sliding of the bolt in the slot, or tightens the handle for operation.

The operation of the pump, as indicated in Fig. 1 is as follows: When the handle 19, properly set at the end of its slotted lever, is pulled away as far as possible from the base member 12 (and stands vertically above the horizontal base), the piston rod is drawn out to its fullest extent and the lever system is in condition to cause the downward force applied to the handle to be transmitted to the piston to produce maximum movement thereof although with least power multiplication. The hand lever, however, may be forced downward in a direct vertical line, which is probably the most practically-effective power line on which a man can exert a downward pressure, enabling the operator to put his whole weight upon the work without losing his balance. In the vertically downward course of the handle 19 the fulcrum levers and pump cylinder both pivot on their lower pivotal axis 10, the effective leverage upon the pump piston rapidly increasing as the point 15, at the end of the piston rod rapidly approaches the line of centers (10—14) of the opposite ends of the fulcrum levers, until at the end of the instroke of the piston the three pivot points (10—15—14) aline. Manifestly by using a short stroke even a light or weak person can work the pump against very heavy pressure, while by working the pump only in the outer portion of its stroke great volumetric delivery with low pressure may be obtained.

Furthermore, it will be apparent that by continuing to force down the handle 16 past the point where the pivot point 19 for the piston alines with the two pivotal centers 11—14 of the fulcrum lever the pump cylinder may be forced over to the opposite side of the line of centers of said fulcrum levers and the handle lever 17 brought into proximity to the base 12. In this position the transverse handle 19 may be loosened, slipped toward the center of the lever 17 and turned parallel to the lever while the base 12 may be pivotally moved around to overlie the pressure gages, the free end of handle lever 17 entering slot 13 as shown in Fig. 3. Thus the device is compactly folded for shipment or transportation.

The great advantage, in a pump having swinging fulcrum levers, of pivoting the pump cylinder both with respect to the fulcrum levers and the sub-jacent structure upon which bearing, for the operation of the pump is to be had will be obvious to those skilled in the art, as the consequent ability to operate the handle in a straight vertical line, or any desired power-line, best conserves the energies of the operator, enabling him to use sheer weight to a large extent rather than hard muscular effort, and the structure gives such long leverages as to make the pump effective to produce very high pressure.

Having thus described my invention, what I claim is:

1. In a pump having a cylinder and a piston rod, the combination of a fulcrum lever, a part to bear on the supporting plane, pivotal connections permitting pivotal movement of the cylinder and fulcrum lever with respect to each other and to the plane of support, an operating handle-lever pivoted upon the fulcrum lever beyond the end of the cylinder, and a connection between said handle lever and the piston rod.

2. In a pump having a cylinder and piston rod, the combination of fulcrum levers on opposite sides of the cylinder extending above and below the free end of the cylinder, and pivotally supported at their lower ends, said cylinder arranged to pass between said fulcrum levers, and a handle lever pivoted to the extremities of the fulcrum levers, said handle lever having connection with the piston rod off-set from the line between the handle and the fulcrum point of the handle lever whereby complete depression of the handle lever forces the pump cylinder through between the fulcrum levers to fold up the pump.

3. In a pump the combination of a foot base, a cylinder and a piston rod, a fulcrum lever, said cylinder and fulcrum lever pivoted with respect to each other and to said base and said fulcrum lever extending upward beyond the cylinders, a handle lever pivotally connected to the extremity of the fulcrum lever, and between its ends pivotally connected to the piston rod.

4. In a pump, the combination of a cylinder and piston rod, a base for foot engagement to hold the structure upon the plane of support, a pair of fulcrum levers, a handle lever pivoted to the upper end of said fulcrum levers, and pivotally connected between its ends to the piston rod, and pivotal connections between the cylinder, fulcrum lever, and base whereby the cylinder and fulcrum levers may move pivotally with respect to each other and to the base.

5. In a pump, the combination of a base, a cylinder pivotally movable thereon, a piston rod, fulcrum levers pivotally movable with respect to the base and pump, and a handle structure pivoted between the fulcrum levers and the piston rod, said handle structure including a handle lever, said base being shaped for coaction with the end of said handle lever to hold it in position when the structure is folded.

6. In a pump, the combination of a base having a slotted boss, a pump cylinder and fulcrum levers having pivotal support from said boss, a piston rod, a handle lever pivotally associated with the piston rod, and fulcrum levers, the end of said handle insertible in said slot when said parts are folded.

7. In a pump, the combination of a base, a pump cylinder and fulcrum levers having pivotal support therefrom, a piston rod, a handle lever pivotally associated with said piston rod and fulcrum levers, said base being shaped to interengage with the end of said handle lever when folded, and a handle longitudinally and rotatably adjustable on the handle lever to accommodate folding thereof.

In testimony whereof I hereunto set my hand in the presence of two witnesses.

WILLIAM A. JOHNSON.

In the presence of—
MARY F. ALLEN,
W. LINN ALLEN.